United States Patent [19]

Morris et al.

[11] Patent Number: 5,433,842
[45] Date of Patent: Jul. 18, 1995

[54] MARINE SEWAGE TREATMENT SYSTEM

[76] Inventors: Nathan Morris, 414 Kentmorr Rd., Stevensville, Md. 21666; Donald P. Gross, 6113 Northdale Rd., Catonsville, Md. 21228

[21] Appl. No.: 193,213

[22] Filed: Feb. 8, 1994

[51] Int. Cl.$^6$ ............................................. C02F 1/02
[52] U.S. Cl. ....................................... 210/104; 210/109; 210/149; 210/173; 210/175; 4/322
[58] Field of Search ............... 210/104, 109, 110, 138, 210/143, 149, 175, 173, 742; 4/322

[56] References Cited

U.S. PATENT DOCUMENTS

| | | | |
|---|---|---|---|
| 2,658,202 | 11/1953 | Wolman et al. | 4/8 |
| 3,396,410 | 8/1968 | Gray | 4/40 |
| 3,546,713 | 12/1970 | Gagne | 4/10 |
| 3,597,769 | 8/1971 | Brainard, II | 4/10 |
| 3,642,135 | 2/1972 | Borden | 210/97 |
| 3,733,617 | 5/1973 | Bennett | 4/10 |
| 3,734,852 | 5/1973 | Borden | 210/152 |
| 3,933,636 | 1/1976 | Daniels | 210/149 |
| 3,936,888 | 2/1976 | Sturtevant | 210/173 |
| 3,951,803 | 4/1976 | Siegel | 210/149 |
| 4,012,322 | 3/1977 | Saigh et al. | 210/149 |
| 4,324,007 | 4/1982 | Morris | 4/321 |
| 4,347,142 | 8/1982 | Albertassi et al. | 210/756 |
| 4,516,281 | 5/1985 | MacPherson et al. | 4/319 |

*Primary Examiner*—Christopher Upton
*Attorney, Agent, or Firm*—Walter C. Farley

[57] ABSTRACT

A marine vessel waste treatment system includes a tank for receiving successive charges of liquid and solid waste material. A water conduit conducts heated water from the vessel's engine through the tank to heat the contents thereof above the level at which coliform bacteria can survive, thereby reducing the count of such bacteria to a level at which it is safe and acceptable to discharge the material into a waterway. A macerator pump is mounted in the tank for operation only after the temperature within the tank is sufficiently high. An electrically operated heating element is also mounted in the tank to accelerate the treatment of waste and can be used alone when desired. A thermal switch at the waste material input inhibits discharge if a fresh charge of material is received when the system is ready to discharge, thereby preventing discharge into the environment of untreated material.

5 Claims, 4 Drawing Sheets

5,433,842

MARINE SEWAGE TREATMENT SYSTEM

Field of the Invention

This invention relates to a system for receiving and treating sewage, especially biologically active human sewage on a water-borne vessel, so that the sewage, after treatment, can be retained or, where circumstances permit, safely discharged into the environment without degrading the environment.

BACKGROUND OF THE INVENTION

In recent years, increased environmental awareness has caused the practice of dumping untreated sewage, especially from marine vessels, into rivers, lakes and oceans to be outlawed with the goal of ending, or at least reducing, such practices. Regulations applicable to marine vessels operated in U.S. waters require that all vessels equipped with toilet facilities be equipped with an approved form of marine sanitation device (MSD) which can either hold the sewage until it can be discharged safely into a shore-side sewage handling facility or can treat it so that it can be safely discharged overboard, 33 CFR Chapter 1, Part 159.

Generally speaking, sewage treatment equipment for applications of this type falls into three rather broad categories (disregarding those devices which merely hold untreated sewage for shore-side disposal). These categories are (a) incineration of the sewage, (b) chemical treatment of the sewage, and (c) heating of the sewage to a temperature level which accomplishes the desired disinfection but which falls somewhat short of incineration. Clearly, the ultimate objective is to reduce the biological activity of the material to a level such that its discharge into waterways is safe as determined by tests defined in the regulations.

Unfortunately, the available types of MSDs which are capable of satisfying the requirements of these regulations are very expensive to buy, either as retrofit equipment for existing vessels or as new equipment on a new vessel, and are also difficult to operate and maintain. In addition, these MSDs generally use chemicals which are themselves dangerous or they use large amounts of the vessel's limited supply of electrical power. For these reasons, it is believed that owners of vessels commonly circumvent the regulations by not using the required equipment with the unfortunate result that the waterway pollution continues.

SUMMARY OF THE INVENTION

Accordingly, an object of the present invention is to provide a system which can receive and hold sewage, accomplish the necessary disinfection and discharge the material into the environment while not endangering the environment.

A further object is to provide such a system in which sewage is held until it is disinfected and wherein the disinfected waste is discharged automatically.

Another object is to provide such a system which makes use of available energy in an efficient manner and which uses minimal energy, consistent with the circumstances, and which uses no dangerous or hazardous chemicals.

Yet another object is to provide such a system which is easy to maintain and operate and which can be installed and operated at reasonable cost, thereby encouraging installation and use.

A still further object is to provide a waste treatment system which complies with requirements set forth in 33 CFR §159 for a Type I MSD, but which can also function as a Type III MSD when the vessel is operating in waters in which the discharge of waste is restricted, whether the waste is treated or untreated. Examples of such areas at the present time are the Great Lakes and California's Catalina Island.

Briefly described, the invention comprises a marine vessel sewage treatment system in a vessel of the type having an engine with a water cooling system in which water is circulated through the engine and is heated by waste heat from the engine. The treatment system comprises the combination of a tank for receiving sewage material having a bacterial count higher than that which can be safely discharged into the environment and means in the tank defining a thermally conductive passageway through said tank. A conduit is provided for conveying heated water from the engine cooling system to the thermally conductive passageway so that the heated water heats the contents of the tank. An electrical heating element is also provided in the tank to add heat to the contents, either in conjunction with or as an alternative to the heat from the engine. A sensor in the tank senses the temperature of the sewage material contained therein and produces an output representative of the temperature reaching a predetermined level, and discharge means macerates and discharges overboard the sewage material when the output signal indicates that the sewage material has been heated to a temperature at which the bacterial count is at a predetermined sufficiently low level.

The system also includes an inhibiting device for preventing overboard discharge of untreated waste material in the event that a fresh batch of material is received just as the system is about to discharge.

BRIEF DESCRIPTION OF THE DRAWINGS

In order to impart full understanding of the manner in which the foregoing and other objects are attained in accordance with the invention can be understood in detail, a particularly advantageous embodiment thereof will be described with reference to the accompanying drawings, which form a part of this disclosure, and wherein.

DESCRIPTION OF THE PREFERRED EMBODIMENT

Before describing the present invention, reference is made to 33 CFR Chapter 1, Part 159 for the purpose of incorporating herein the definitions set forth therein, especially of the terms sewage, discharge, vessel, fecal coliform bacteria and marine sanitation device (which is abbreviated herein as "MSD"), and also the test definitions.

The present invention is based in part on the recognition of the fact that the fecal coliform bacteria count in sewage can be significantly reduced or eliminated if the sewage is heated above 145° F. (63° C.) and that a complete coliform bacteria kill is accomplished after only 10 seconds in a tank the contents of which are heated to at least 170° F. (77° C.). The apparatus of the present invention is capable of accomplishing the controlled elevation of the sewage temperature well above the desired minimum level to thereby reduce the fecal coliform count to not more than 200 per 100 ml, thus permitting the safe discharge of the resulting material overboard. In addition, the apparatus macerates the waste material so that the discharged material includes no visible floating solids. In actuality, the system goes much farther than required by the regulations. As will be described in more detail, a switch is provided on the operator control panel which enables the vessel operator to select between Type I operation or Type III operation. This switch can be a simple toggle switch or a locking key switch, enabling the vessel operator to select the appropriate mode of operation for the area in which the vessel is operating. A locking switch prevents inadvertent or accidental changing of the switch to an inappropriate or illegal mode of operation.

The treatment process of the invention virtually eliminates all fecal coliform bacteria. Apparatus in accordance with the invention therefore easily complies with the fecal coliform bacteria limits of Type I MSD requirements as specified in 33 CFR §159.

Test procedures specify that the influent (for test purposes) must have at least b 500 mg/liter of suspended solids prior to treatment. Type I MSD requirements specify that there be no visible floating solids in the effluent.

Results of tests show that an apparatus in accordance with the invention reduces the suspended solids from the initial 500 mg/liter to approximately 350 mg/liter, and the macerator/discharge pump within the treatment tank macerates the waste so that there are no visible floating solids. Thus, Type I requirements easily can be met.

Figure 1:
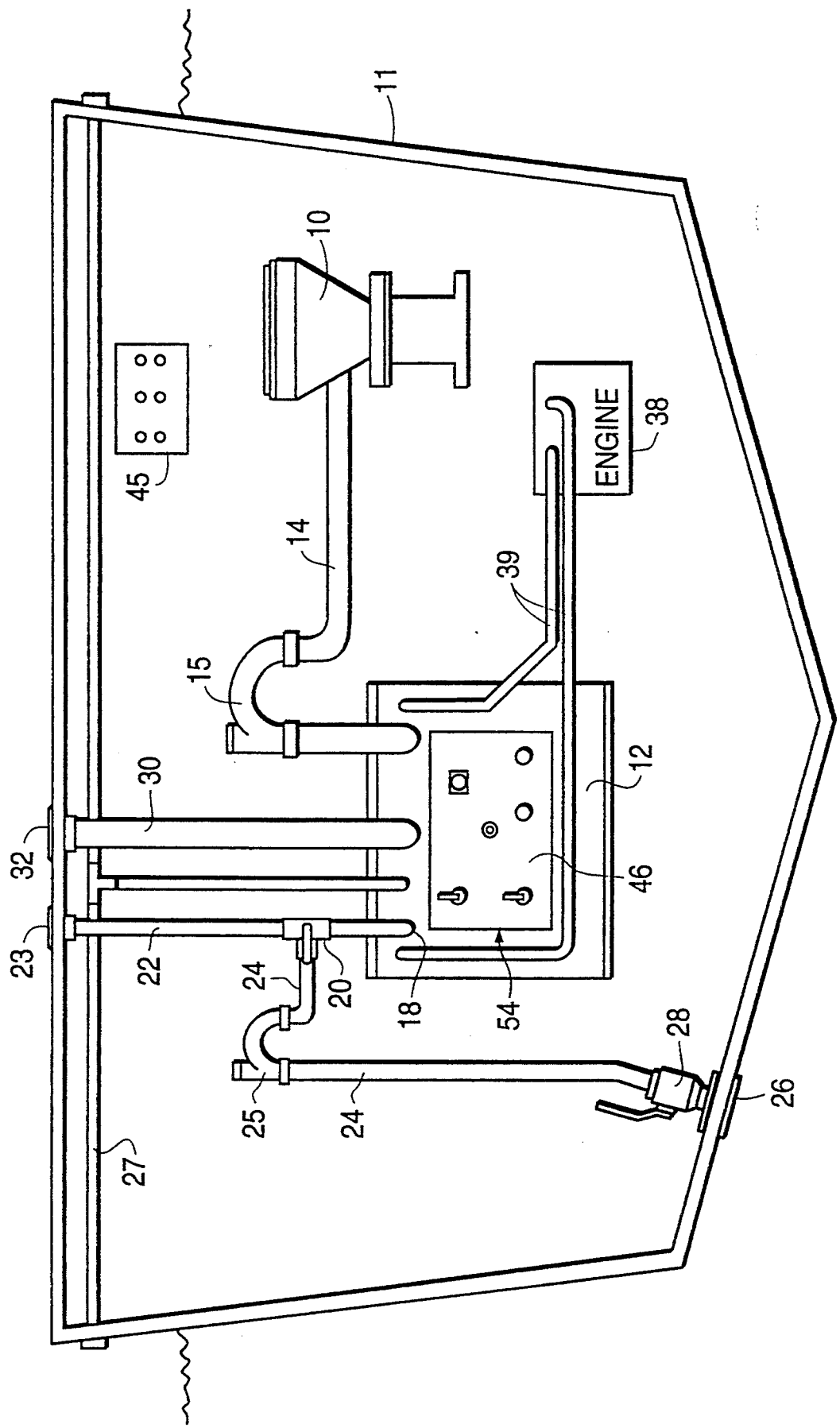
FIG. 1 is a schematic diagram of a marine vessel with the components of a system and their plumbing interconnections in accordance with the present invention.
Figure 2:
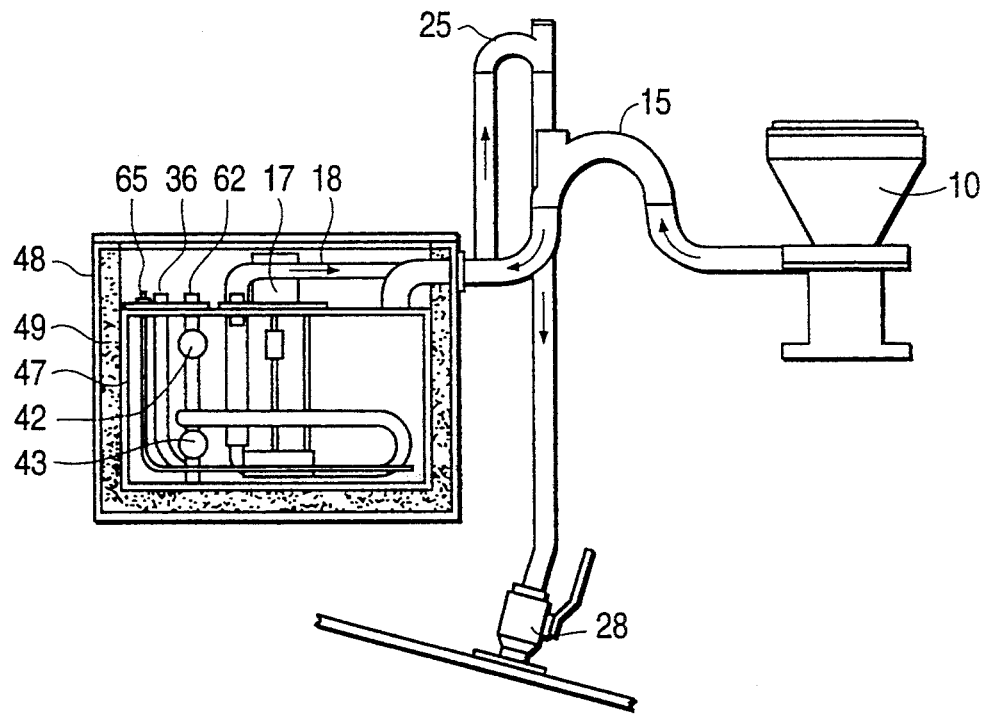
FIG. 2 is a partial side elevation, in partial section, of the apparatus of FIG. 1.
Figure 3:
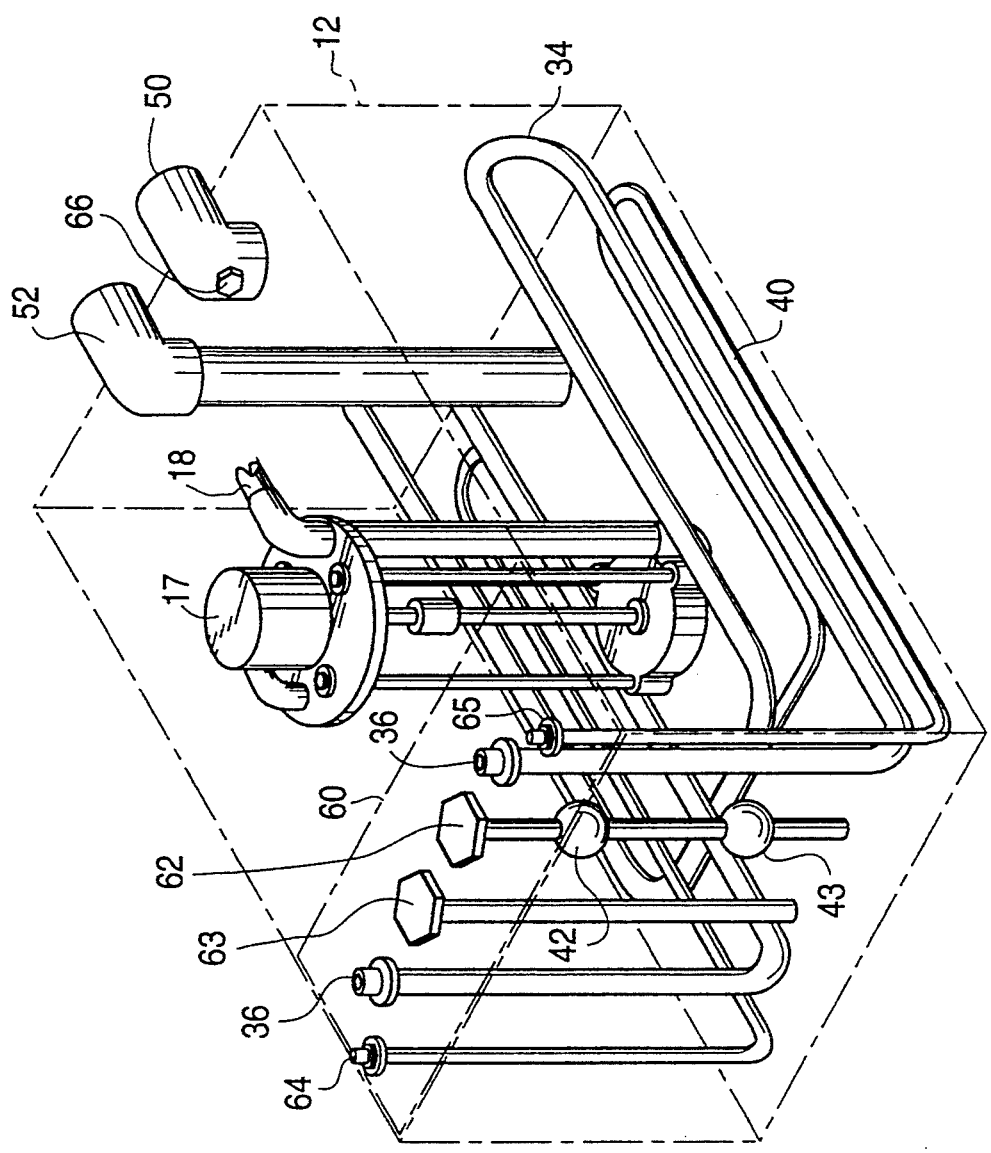
FIG. 3 is a partial phantom perspective view of the interior of the treatment tank of FIGS. 1 and 2 showing the arrangement of elements therein.

A typical normal installation of an apparatus in accordance with the invention is illustrated in FIG. 1 and a typical treatment tank is shown in more detail in FIGS. 2 and 3. FIG. I shows how the invention would normally be installed in a vessel with the plumbing connections made between the toilet and the treatment tank, between the engine and the treatment tank, and between the treatment tank and the discharge points (overboard or through deck fittings). One or more toilets 10 are mounted within a vessel 11, the hull of which is only schematically shown, each toilet being connected to discharge directly into a holding and treatment tank 12 through a discharge line 14 which is provided with a conventional anti-siphon vented loop 15 to prevent back-flow. The inner and outer walls 47 and 48 of the holding and treatment tank 12 are spaced apart and the intervening space is filled with insulation 49 to retain heat within the tank.

A macerator and discharge pump unit 17 is mounted on the top of the tank and extends to within less than an inch of the bottom of the tank so as to be able to substantially empty the tank and to reduce the particle size of material from the tank as it is pumped overboard. The macerator and discharge pump is preferably similar to that shown and described in U.S. Pat. No. 4,324,007, Morris. Macerator and pump 17 has a discharge pipe 18 which leads to a Y-valve 20 having two outlets. One of the outlets of the Y-valve is connected to a pipe 22 leading to a ¾" deck fitting 23 and the other is connected to a conduit 24, having a vented anti-siphon loop 25, leading to a discharge opening 26 which can be provided with an outlet valve 28. Valve 20 allows the operator to choose whether the discharge from the tank is to be directed overboard through conduit 24 and hull fitting 26 or through deck fitting 23 into a shore-based waste handling system. In normal operation, valve 20 would be in the position to elect overboard discharge.

A standpipe 30 extends from adjacent the bottom of the inside of the tank to a 1½" deck fitting 32 to permit the contents of the tank to be removed by suction using conventional dockside equipment, not shown, if desired. A vent tube 27 is also connected to the tank and has openings at opposite sides of the hull.

Within the tank (FIG. 3) is a heat exchange tube 34 which has fittings 36 connecting the heat exchange tube to the cooling system of the vessel's engine 38 through a conduit loop 39. The conduits of loop 39 are connected to the engine cooling system at any point where it is convenient to interrupt the normal cooling circulation path, such as at a hose connection from the engine block to a cooling heat exchanger so that, whenever the vessel's engine is operating, heated cooling water from the engine cooling system is caused to pass through conduits 39 and tube 34, heating the tube and the contents of the tank, after which the water is returned to the engine cooling system. Also within the tank is one or more electrical heating elements 40, only one being shown, which is energized from the electrical system of the boat, as will be described, or by a shore-service electrical connection. The number of heating elements is chosen in accordance with the size of the tank which, in turn, is selected to accommodate the size of the vessel, taking into consideration such factors as the anticipated number of passengers, space available, the desired rapidity of waste treatment and the like. The electrical element is used in conjunction with the heat from the engine cooling system.

Level sensors 42 and 43 are mounted in tank 12 with active sensor elements or floats exposed to the interior of the tank for the purpose of detecting, respectively, upper and lower levels of liquid therein. The sensors are connected to the control circuits through a top connector on a supporting tube 62.

Figure 4:
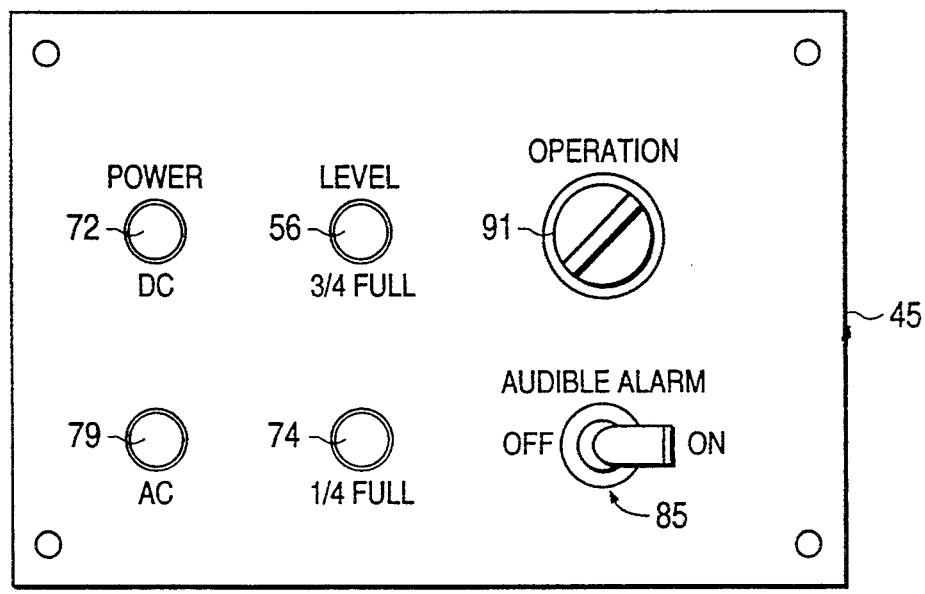
FIG. 4 is an illustration of a control panel showing the arrangement of components thereon.

At some convenient location, such as the bridge, head compartment or cockpit of the vessel, is a monitor and control panel 45 (shown enlarged in FIG. 4) which includes lights and control switches, to be described, enabling the operator of the vessel to monitor and control the operation of the waste treatment system. At least some of the lights and control switches can also be duplicated on a panel 46 at the tank itself to facilitate maintenance thereof.

FIG. 3 is a perspective view of the interior of tank 12, with the insulating covering removed and the inner wall shown in phantom lines. Various components of the system described above are mounted on the inner wall so as to extend into or be exposed to the interior of the tank. The macerator unit 17, an L-shaped fitting 50 for connection to inlet pipe 14 and a fitting 52 for connection to standpipe 30 are visible at the top of the tank inner wall.

An electrical control unit enclosure 54 houses the electrical controls, to be described. Enclosure 54 is mounted at any convenient location and is connected to the electrical components of tank 12 and to the control panels 45 and 46 by conventional multiconductor marine cable.

An access cover 60 is attached to the top of the tank. Cover 60 supports fittings 36 which are mounted on the ends of heat exchanger tube 34. Also mounted in cover 60 are connectors 64 and 65 which are attached to the ends of electrical heating elements 40 and tube 62 which is mounted in cover 60 at top wall of the tank. A thermostat 66 is mounted in the inlet fitting 50. Additional temperature responsive switches 67 and 68 are supported in a tube 63, the sensors and switches themselves being within the tube and being shown in the electrical schematic diagram of FIG. 5.

Figure 5:
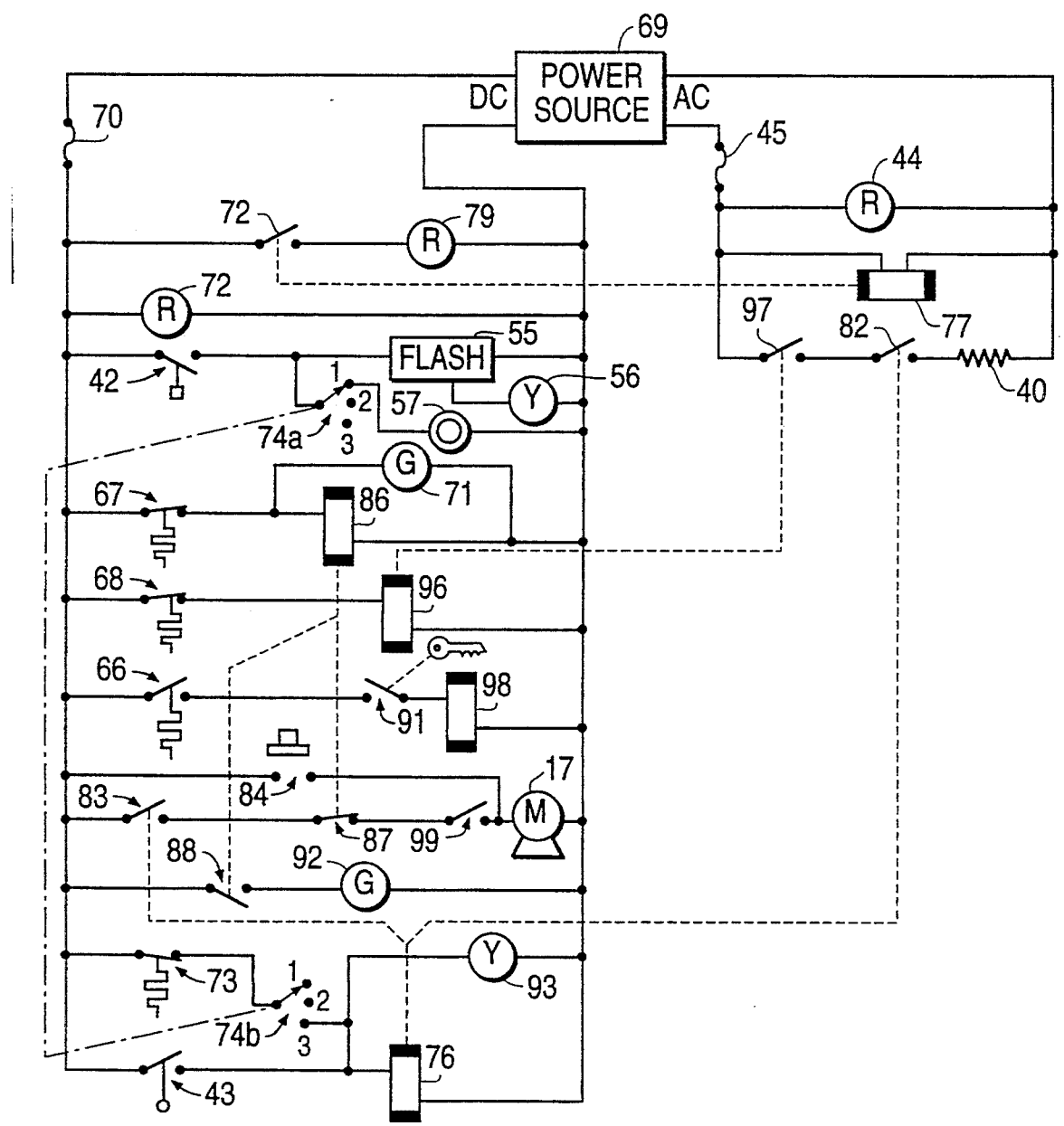
FIG. 5 is an electrical schematic diagram showing the electrical components of the system and their interconnection.

FIG. 5 shows a schematic diagram of the DC and AC circuits of the electrical system which controls the operation of the treatment tank. There are two primary circuits in the system. One is a series DC circuit which controls the operation of pump 17 to pump treated sewage from the tank overboard. The other is an AC circuit which energizes heating element(s) 40 to elevate the temperature of the sewage as discussed above. The other parts of the electrical system are for the purpose of properly controlling the operation of the heater and pump.

Considering the DC system first, the positive and negative terminals of the DC circuit are connected to a power supply on the vessel comprising the usual alternator (or generator), rectifier and battery system 69 of the vessel, or to a dockside power supply, through a circuit breaker or fuse 70. An LED indicator lamp 72, preferably red, is connected between the DC lines and is physically mounted on monitor and control panel 45 to inform the operator that the system has DC power. As mentioned before, this indicator lamp and others can, if desired, be duplicated on panel 46, but this is not shown in the drawing for simplicity.

Level sensor 42 is connected in series with a flasher 55 which alternatingly turns an LED indicator (yellow) 56 on and off, indicating that the treatment tank is about ¾ full. At the same time, an audible alarm 57 is energized if switch portion 74a of a two-pole, three position switch is in the first position. Alarm 57 can be silenced by moving switch 74a to the second position, but LED 56 continues to flash.

A relay winding 76 and an LED indicator lamp 93, preferably yellow, are operated by a liquid level sensing switch 43. The normally open switch of level sensor 43 closes when the liquid within tank 12 reaches a minimum level in the tank, about 15% of the tank capacity, indicating that the tank contains sufficient material for processing to be undertaken. An alternative operating circuit for winding 76 and LED 93 includes a thermal switch 73 which closes when the liquid temperature is at or below about 104° F. (40° C.). Switch 73 is connected to relay 76 when a second portion 74b of the three-position switch is in the third position. In this operating mode, called the idle mode, heater 40 is caused by switch 73 to operate whenever the fluid temperature is at or below 104° F. This operation also requires that relay 96 be energized, but that will always be true if switch 73 is closed since switch 68 closes at a higher temperature than switch 73.

In the AC circuit, power is supplied through a circuit breaker or fuse 45. A relay winding 77 is connected directly across the AC lines and is thus energized whenever the AC supply is present. A normally open contact set 78, operated by winding 77, is connected in series with an LED indicator lamp 79, preferably red, across the DC lines, indicating on control panel 45 that AC power is present. A red lamp 44 connected across the AC lines directly also indicates the presence of AC power. A normally open contact set 82 operated by winding 76 and the element of heater 40 are connected in series circuit relationship with a normally open contact set 97 operated by a relay winding 96.

In the DC circuit, the normally closed contact set of a thermal switch 68 is connected in series with winding 96. Switch 68 is closed whenever the temperature of the liquid in which it is immersed is below 190° F. (88° C.). Thus, when level switch 43 is closed, indicating that there is liquid present, and when switch 68 is closed, treatment is needed and heater 40 is energized to supply heat to the contents of the tank along with the heat from engine 38.

A thermal switch 67 is closed whenever the temperature of the liquid is below 175° F. (79° C.), providing power to the winding of a relay 86 and to a green LED indicator 71. When that temperature is above 175° F., switch 67 is open, de-energizing relay 86. Normally closed contact set 87 is operated by relay 86 and is in a series circuit to control the energization of discharge pump/macerator unit 17. Also in that series circuit is a contact set 83 which is closed when relay 76 is energized and a contact set 99 which is closed when relay 98 is energized by closing of thermostat 66.

Thermostat 66, mounted in inlet fitting 50, opens whenever its temperature is below 125° F. (52° C.) and is included to detect a "fresh" flush which might occur just when the system is ready to pump out. Whenever a new flush of cold water passes through fitting 50, thermostat 66 opens, preventing energization of relay 98. Temperature switch 66 remains open until fitting 50 is reheated by heated air from within the tank. The several minutes required for this reheating is adequate to allow the contents of the newly arrived material to be heated to the required temperature or, if it constitutes a very large additional volume of cold material, the delay allows the reduced temperature of the tank contents to be detected by switch 67.

A key switch 91 is in series with temperature switch 66 and the winding of relay 98, switch 91 being operable by the vessel operator, as mentioned above, to allow or prevent overboard discharge. When key switch 91 is closed and there has been no recent flush, relay 98 is energized, closing contact set 99 in the motor-controlling series circuit including contact sets 83 and 87. When all of the contact sets and switches in this series circuit are closed, the motor of pump 17 is operated and the treated waste is discharged overboard.

An emergency pump-out, momentary contact switch 84 is connected directly in series with the pump motor, bypassing switch 91 and contact sets 83, 87 and 99, to permit operation of the pump under emergency circumstances. This switch should be located only on the housing itself as previously mentioned, so as to preclude inadvertent use of the emergency pump-out feature. Since the switch itself is a momentary contact switch, it must be manually held in the depressed position in order to operate pump motor 17 without closure of switch 91 and contact sets 83, 87 and 99.

While much of the operation will be understood from the foregoing, a summary of the system operation follows. After waste material has been deposited in toilet 10, the toilet is flushed and the waste material is conducted, either by gravity or by a conventional pump associated with the toilet for that purpose, to tank 12. Whenever the engine of the vessel is operating, the engine heats its cooling water which is circulated in the engine by a water pump in a well-known fashion. The usual recirculation path is diverted and caused to pass through conduits 39 to tube 34. As the heated water, which is normally controlled by a conventional engine thermostat at a temperature on the order of 180° F. (82° C.) after the engine has warmed up to its normal operating temperature, passes through tube 34 in tank 12, the sewage in the tank 12 in which the tube is immersed is also heated. In addition, when the temperature of the contents of the tank is below the level of operation of thermal switch 68 and when there is a sufficient amount of material in the tank to close switch 43, and when 115 VAC is supplied by the vessel generator or by shore power, the electrical element is energized, adding heat to the tank. Together, these sources of heat raise the temperature in the tank quickly and the use of engine heat reduces the amount of electrical energy needed. Thermostat 67 in the tank determines when the contents have been heated to a temperature which, preferably, equals or exceeds 175° C.) a temperature which is chosen because it is sufficiently higher than the minimum temperature of 155° F. (68° C.) to assure that all of the tank contents have been heated adequately to have the desired bactericidal effect. The control panel keeps the vessel operator informed about the level of material in the tank and when power is present.

It will be noted also that temperature sensors 67 and 68 are spaced from tube 34 and electrical element 40 so that they are responding to the temperature of the material in the tank and not directly to the temperature of tube 34 or element 40.

Several conditions must be met simultaneously in order to start the automatic pump-out operation. It is necessary for there to be enough material in the tank for float switch 43 to be closed, thereby assuring that the pump will not run without material and that the other readings are valid. The temperature of the material must be high enough to close thermal switches 66 and 67. The manually operated switch 91 must be in the proper position. When all of these conditions are satisfied, the motor of macerator 17 is energized and the contents are pumped out through fitting 26 (or 23) while the solids contained therein are pulverized to an acceptable size.

It is especially important to recognize the function of thermostat 66. It is possible for the system to have operated as planned so that the tank contains a quantity of waste material and heat has been applied to kill all coliform bacteria. Absent thermostat 66, the system would then pump out. The pump-out would occur even if, at the last minute, a "fresh" flush of waste material entered the tank because thermal switch 67 would not have time to respond to the entry of the new cold water. However, thermostat 66 is physically located in the inlet pipe above the level of liquid in the tank and responds immediately to the inrush of cold water associated with a flush and opens the energization circuit for pump motor 17, thereby preventing an imminent pump-out or interrupting one if it has already started. After three minutes or longer, thermostat 66 recloses because of heat conducted from the inside of the tank. If the temperature conditions are right after that time-out interval, then the pump is activated, pumping out the contents.

As mentioned above, if the vessel is operating in an area where pump-out is not permitted, switch 91 is set to the open position at panel 45.

The system and its operation have been described in the context of a system which is used on a marine vessel because that is the context in which it was developed and will be first used. However, it should be recognized that the system is quite usable and advantageous for use in other than marine contexts with minor modification. For example, treating the sewage from a home or office building with a system using an electrical heater alone, or an electrical heater in conjunction with a waste heat source such as the chimney of a heating furnace or the like, permits treated sewage to be discharged into a municipal sanitary system, greatly reducing the noxious quality of the effluent, thus reducing the treatment load on whatever municipal facility might exist.

While certain advantageous embodiments have been chosen to illustrate the invention, it will be understood by those skilled in the art that various changes and modifications can be made therein without departing from the scope of the invention as defined in the appended claims.

What is claimed is:

1. A marine vessel waste treatment system for a vessel of the type having an engine with a liquid cooling system in which coolant is circulated through the engine and is heated by waste heat from the engine, the treatment system comprising the combination of a tank for repeatedly receiving quantities of waste material having a bacteria count higher than that which can be safely discharged into the environment, said tank including an inlet conduit for conducting said quantities of waste material into said tank, said conduit being positioned above a maximum level of material in said tank;

heat exchange means in said tank defining a thermally conductive passageway through said tank;

conduit means for conveying heated coolant from the engine cooling system to said thermally conductive passageway to thereby heat the contents of said tank;

means in said tank for sensing the temperature of waste material contained therein and for producing an output representative of said temperature reaching a predetermined level;

means for macerating and discharging overboard said waste material when said output indicates that said waste material has been heated to a temperature at which said bacterial count is at a predetermined low level; and means for preventing discharge of said material within a predetermined time interval of receipt of the last received quantity of untreated sewage, said means for preventing including a temperature responsive switch thermally coupled to said inlet conduit and responsive to reduction in temperature of said inlet conduit by influx of a quantity of waste to prevent operation of said means for macreating and discharging.

2. A system according to claim 1 and further comprising means responsive to a level of material in said tank for inhibiting discharge of material when said level is below a predetermined level.

3. A system according to claim 1 wherein said tank further includes an electrical heating element and said system includes means for connecting said heating element to a source of electrical energy for supplementing the heat supplied by said heated water.

4. A marine vessel waste treatment system for a vessel of the type having an engine with a liquid cooling system in which coolant is drawn into the engine, is heated by waste heat from the engine and is discharged overboard, the treatment system comprising the combination of a source of electrical power;

a tank for receiving waste material having a bacterial count higher than that which can be safely discharged into the environment, said tank including an inlet conduit for conducting said waste material into said tank, said conduit being positioned above a maximum level of material in said tank;

a heating element in said tank connected to said source for heating the contents of said tank;

heat exchange means in said tank defining a thermally conductive passageway through said tank;

conduit means for conveying heated coolant from the engine cooling system to said thermally conductive passageway to thereby heat the contents of said tank;

means in said tank for sensing the temperature of waste material contained therein and for closing an electrical switch when said temperature reaches a predetermined level;

means including a pump motor for macreating and discharging overboard said waste material;

electrical circuit means connected to said source of power and to said electrical switch for supplying power to said pump motor only when said waste material has been heated to a temperature at which said bacterial count is at a predetermined low level; and means for preventing discharge of said material within a predetermined time interval of receipt of the last received quantity of untreated sewage, said means for inhibiting including a temperature responsive switch thermally coupled to said inlet conduit and responsive to reduction in temperature of said inlet conduit by a quantity of waste and to interrupt power to said pump.

5. A system according to claim 4 wherein said temperature predetermined level is no less than 155° F.

* * * * *